United States Patent
Ivanovic et al.

(10) Patent No.: US 9,344,671 B2
(45) Date of Patent: May 17, 2016

(54) SYSTEM AND METHOD FOR ARTIFACT REMOVAL

(71) Applicant: ATI Technologies, ULC, Markham (CA)

(72) Inventors: Boris Ivanovic, North York (CA); Allen J. Porter, Sunderland (CA); Yubao Zheng, Markham (CA)

(73) Assignee: ATI Technologies ULC, Markham, Ontario (CA)

(*) Notice: Subject to any disclaimer, the term of this patent is extended or adjusted under 35 U.S.C. 154(b) by 550 days.

(21) Appl. No.: 13/644,676

(22) Filed: Oct. 4, 2012

(65) Prior Publication Data

US 2014/0022452 A1   Jan. 23, 2014

Related U.S. Application Data

(60) Provisional application No. 61/672,689, filed on Jul. 17, 2012.

(51) Int. Cl.
*H04N 7/01* (2006.01)

(52) U.S. Cl.
CPC .................................. *H04N 7/0117* (2013.01)

(58) Field of Classification Search
CPC ....................................................... H04N 19/59
USPC ...................................................... 375/240.27
IPC ............................................................ H04N 7/01
See application file for complete search history.

(56) References Cited

U.S. PATENT DOCUMENTS

| | | | |
|---|---|---|---|
| 6,104,434 A * | 8/2000 | Nakagawa et al. | 375/240.16 |
| 2002/0105526 A1 * | 8/2002 | Gonsalves | 345/589 |
| 2009/0092337 A1 * | 4/2009 | Nagumo | 382/299 |
| 2009/0279609 A1 * | 11/2009 | De Haan et al. | 375/240.16 |
| 2010/0157073 A1 * | 6/2010 | Kondo et al. | 348/208.4 |

* cited by examiner

*Primary Examiner* — Yulin Sun
(74) *Attorney, Agent, or Firm* — Faegre Baker Daniels LLP

(57) ABSTRACT

A method and apparatus provide for improving signal quality. The method includes receiving a first media signal, such as a video signal, in a first format, such as 1080p. The provided video signal is one that is created by upsampling a video signal recorded in a format having a lower sampling rate. The method also includes obtaining a second signal indicative of error within the first media signal. The second signal is in a second format, such as the format having a lower sampling rage in which the video signal was recorded. The signal is processed to place the second signal in the format of the first signal. Then, the estimated error signal is combined with the original signal to arrive at an error corrected output.

23 Claims, 4 Drawing Sheets

SYSTEM AND METHOD FOR ARTIFACT REMOVAL

PRIORITY

The present application claims priority to and the benefit of U.S. Provisional Application Ser. No. 61/672,689, titled SYSTEM AND METHOD FOR COMPRESSION ARTIFACT REMOVAL, filed Jul. 17, 2012, the disclosure of which is expressly incorporated herein by reference.

FIELD OF THE DISCLOSURE

The present disclosure is related to methods and devices for video and audio processing. The present disclosure is related more specifically to methods and devices for providing error corrected signals in a power and processing efficient manner.

BACKGROUND

In circuits, media signals (video, still image, music) are often passed between components and between devices. Such transmission is often performed via compression of the signals to reduce the amount of data sent. Differing components and devices also have differing abilities to present the data (such as differing screen resolution). Each of compression algorithms, corresponding decompression algorithms, and any upsampling generally that is performed on a signal leaves artifacts having a relation to the original signal and the upsampling done.

Media signals, and indeed signals generally, often undergo processing to remove artifacts from compression/decompression or otherwise to provide a cleaner signal. The various processing permutations applied to a signal create many different signal signatures that each need their own algorithm to remove unwanted artifacts. However, certain common signatures have more readily available artifact removal algorithms.

Additionally, many signals, such as standard definition (SD) signals or lower resolution video, are upconverted to high definition (HD) signals. These upconverted signals are much larger but do not have any truly additional information. Thus, these upconverted signals provide more data to sift through and process.

Accordingly, there exists a need for an improved method and apparatus that provides for artifact/error removal of media signals without requiring a unique algorithm for each provided signal.

There further exists a need to be able to process media signals without having to process all data created by upconversion, or otherwise.

DETAILED DESCRIPTION OF EMBODIMENTS

In an exemplary and non-limited embodiment, aspects of the invention are embodied in a method provided for improving signal quality. The method includes receiving a first media signal, such as a video signal, in a first format, such as 1080p. The provided video signal is one that is created by applying a permutation (e.g., upsampling) of a video signal recorded in a format having a lower sampling rate. The method also includes obtaining a second signal indicative of error within the first media signal. The second signal is in a second format, such as the format having a lower sampling rage in which the video signal was recorded. The signal is processed to place the second signal in the format of the first signal. Then, the error signal is combined with the original signal to arrive at an error corrected output.

In another exemplary embodiment, a signal processor is provided including a signal de-permutation element operable to at least partially reverse permutations previously applied to a first signal; an error circuit operable to output a second signal indicative of error present within the first signal; a first scaler operable to apply permutations to the second signal to place the second signal in the format of the first signal; and a combiner operable to combine the first signal and the second signal.

In yet another exemplary embodiment, a computer readable medium containing non-transitory instructions thereon is provided. When the instructions are interpreted by a processor, they cause the processor to: receive a first media signal in a first format, the first format resulting from having undergone at least one permutation from an original format; generate a second signal indicative of error within the first media signal, the second signal being in the second format, the second format being different than the first format; apply a second permutation to the second signal to place the second signal in the first format; and combine the first media signal and the second signal.

As previously noted, often video (and still image and audio) signals are compressed, are decompressed, are upsampled, undergo format changes, and are otherwise altered between original generation and being provided to a user.

Figure 1:
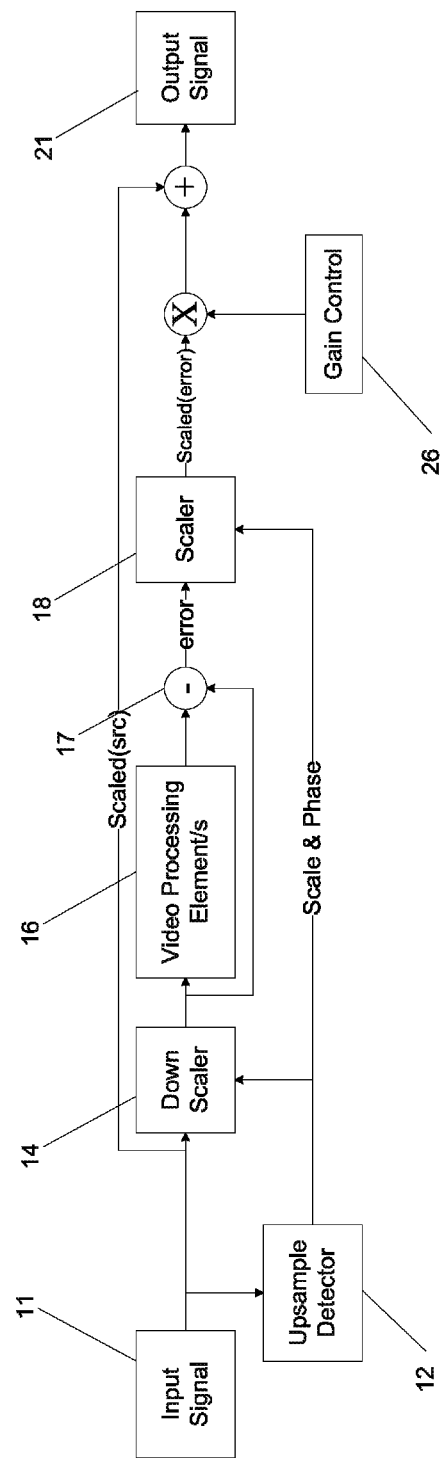
FIG. 1 is a diagram showing architecture of a circuit implementing video quality correction/improvement according to an embodiment of the present disclosure.

FIG. 1 shows circuit 10 for receiving a transmitted signal and applying restoration algorithms to output a signal that has removed and/or attenuated artifacts present in the originally received signal.

Circuit 10 includes up-scaling (upsample) detector 12, downscaler 14, video processing element 16, difference generator 17, difference scaler 18, and gain controller 26.

Figure 4:
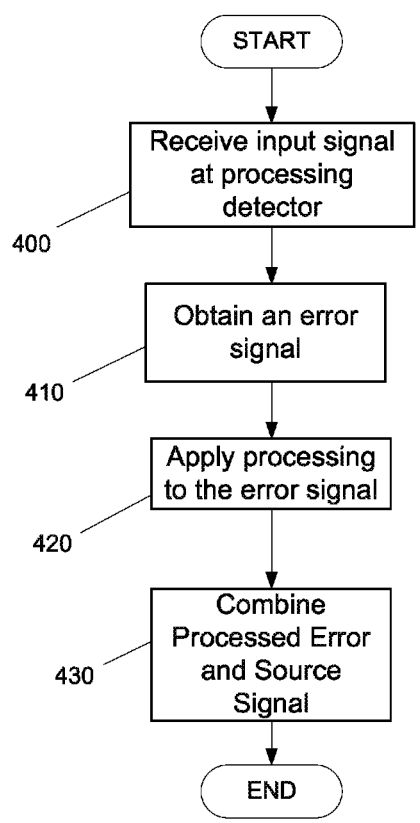
FIG. 4 is a flowchart describing operation of the circuits according to an embodiment of the present disclosure.

In a first embodiment of operation, an input signal is received, block 400 (FIG. 4) and a signal indicative of error is obtained, block 410. Processing is applied to the error signal, block 420 and the processed error signal is combined with the source signal, block 430.

In further operation according to another embodiment, circuit 10 receives a video signal (the "input signal") 11. The received video signal is one that has undergone upsampling or other permutations to change it from its original format (the "native format signal"). The input signal is directed to up-scaling detector 12, block 300 of FIG. 3. It should be appreciated that while up-scaling detector 12 is described herein as detecting upscaling, the concepts discussed herein can be applied to any type of alteration to an input signal where the alteration can be detected and substantially reversed. Up-scaling detector 12 performs a spectrum analysis (or other analysis such as detecting edge sharpness) to ascertain the native format of the signal (original resolution, scaling phase (i.e. pick out the original pixels and use those original pixels rather than interpolated pixels), scaling technique), block 310. Stated differently, up-scaling detector 12 ascertains transformations and permutations applied to the native format signal to arrive at the input signal.

In another embodiment, up-scaling detector 12 performs multiple detection passes using different techniques and each technique can either confirm or refute the others. In some cases, signals can go through multiple format changes prior to arriving at a display. Sometimes the native format signal can originally exist in a lower resolution and is then up-scaled to a higher resolution prior to compression. It is also possible that a signal delivered in one format is decoded, converted to a new resolution and then re-compressed. When this occurs, the signature of the noise from the first encoding is changed due to the resampling process. Each of these processes are of the type to be discovered and determined by upsample detector 12.

Figure 3:
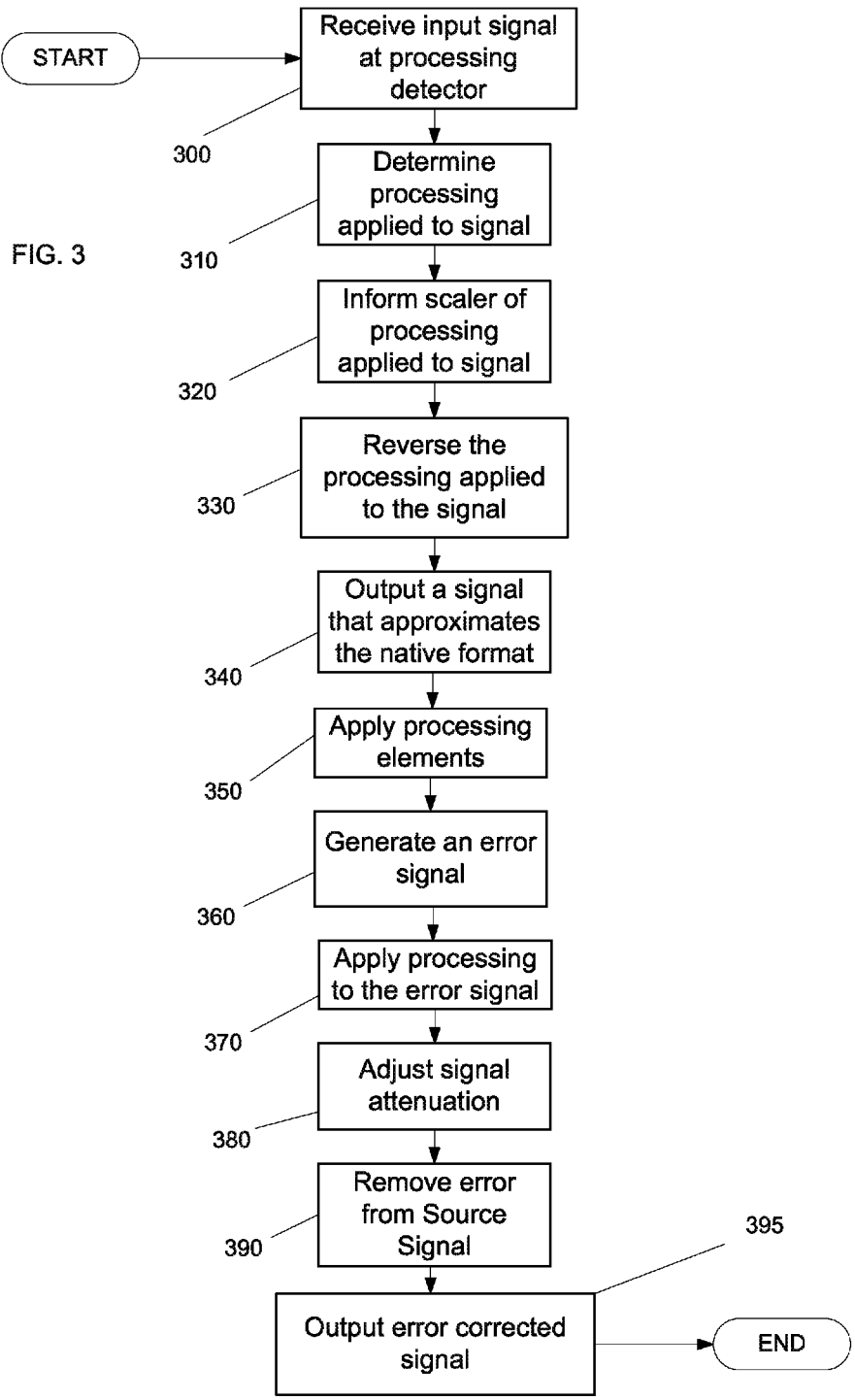
FIG. 3 is a flowchart describing operation of the circuits according to an embodiment of the present disclosure.

Both the input signal 11 and the output of up-scaling detector 12 are input to downscaler 14, block 320 of FIG. 3. Given the knowledge of how the provided signal has been modified, downscaler 14 attempts to un-do the modification by down scaling the input signal, block 330 of FIG. 3.

Again, while downscaler 14 is described, when the input signal has undergone alteration other than upscaling, different pieces would be placed instead of downscaler 14. Regardless of the specific embodiment, the piece located at the location of downscaler 14 is able to at least partially un-do the alterations performed on the input signal to arrive at an output that more closely approximates an original format of the signal, block 340 of FIG. 3.

The output that more closely approximates an original format is then input to video processing element 16. Video processing element 16 then applies restoration algorithms to the signal to remove noise and/or errors therefrom, block 350 of FIG. 3. Given that the signal input to video processing element 16 more closely approximates a native format, existing restoration (de-noising) algorithms can more readily be effectively applied. video processing element 16 thus outputs a signal that is in a format that approximates the native format and that is error corrected.

This estimated error corrected signal is then compared to the uncorrected (approximately native format) signal. A difference between the two is determined. This difference is representative of the noise and/or estimated and perceived error in the signal, block 360 of FIG. 3.

The estimated error signal is fed to scaler 18. Scaler receives information about how the originally input signal was transformed (scale and phase information) from the upsample detector 12. Scaler 18 then applies the inverse transformation to the estimated error signal to place the error signal in a similar format to the input signal.

Gain control 26 is then used to adjust the amount of signal attenuation in the source space, block 380 of FIG. 3. A greater gain results in a greater number of artifacts being removed. However, a greater gain also increases the possibility that desired detail is removed from the signal as well. Gain control 26 is illustratively provided as a slider control in a user interface. Embodiments are envisioned where gain control is determined by an algorithm that implements a feedback loop or other calibration. Still further, embodiments are envisioned where gain is fixed based on a calculated or measured value.

The estimated error signal is then attenuated from the input signal, block 390 of FIG. 3, to produce an estimated error corrected output signal 21 to an output, block 395. Accordingly, robust existing restoration algorithms for native formats can be applied regardless of what processing has been applied to a signal.

Figure 2:
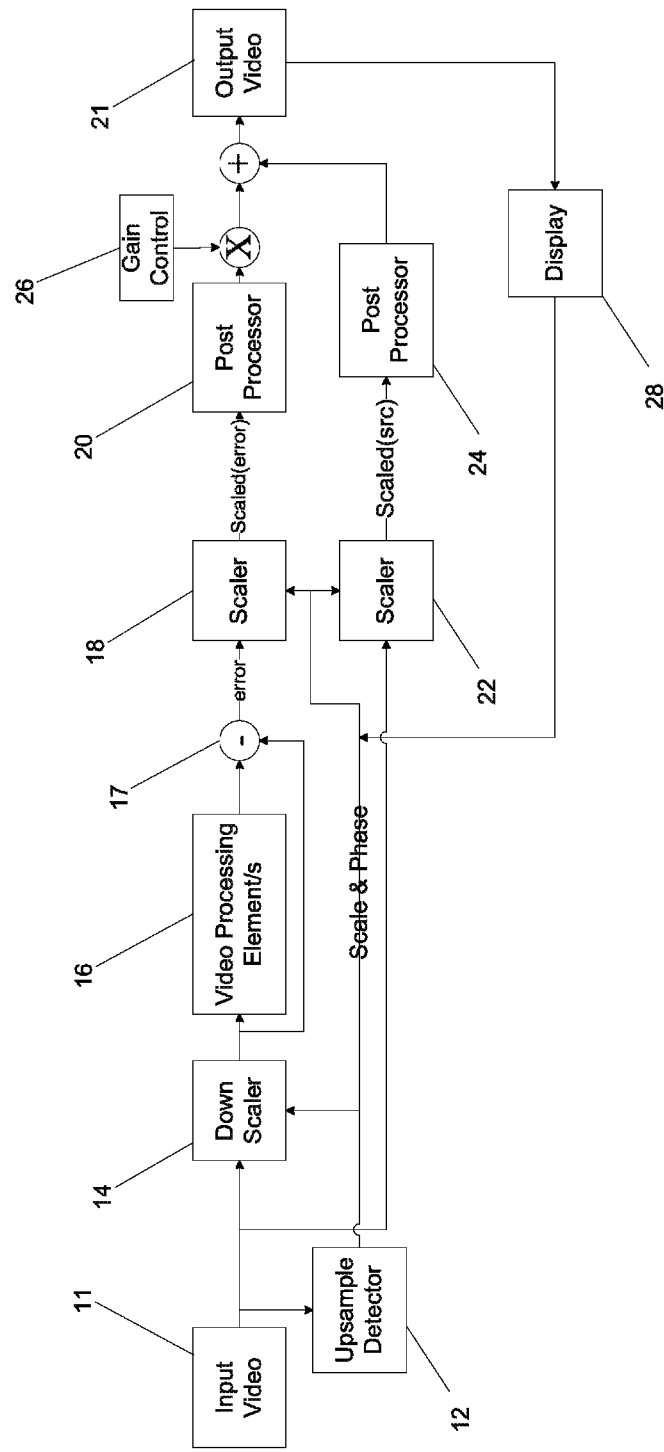
FIG. 2 is a diagram showing a second embodiment circuit implementing video quality correction/improvement according to an embodiment of the present disclosure.

With reference to FIG. 2, circuit 10' is a second embodiment of circuit 10. Circuit 10' provides for further processing to further customize the output for a specific display 28. Circuit 10' includes up-scaling (upsample) detector 12, downscaler 14, video processing element 16, estimated difference scaler 18, estimated error post-processor 20, source scaler 22, source post-processor 24, gain controller 26, and display 28.

In operation, circuit 10' receives the input signal that has undergone upsampling or other permutations to change it from its original format. The input signal is directed to up-scaling detector 12, block 300 of FIG. 3. Up-scaling detector 12 ascertains transformations and permutations applied to the native format signal (via a spectrum analysis or other analysis) to arrive at the input signal, block 310 of FIG. 3.

Both the input signal and the output of up-scaling detector 12 are input to downscaler 14. Given the knowledge of how the provided signal has been modified, downscaler 14 attempts to un-do the modification by down scaling the input signal, block 330 of FIG. 3, to arrive at an output that more closely approximates an original format of the signal, block 340 of FIG. 3.

The output that more closely approximates an original format is then input to video processing element 16. Video processing element 16 then applies restoration algorithms to the signal to remove noise and/or estimated errors therefrom, block 350 of FIG. 3. Given that the signal input to video processing element 16 more closely approximates a native format, existing restoration algorithms can more readily be effectively applied. Video processing element 16 thus outputs a signal that is in a format that approximates the native format and that has its estimated error attenuated.

This estimated error corrected signal is then compared to the uncorrected (approximately native format) signal. A difference between the two is determined. This difference is representative of the noise and/or estimated or perceived error in the signal, block 360 of FIG. 3.

The estimated error signal is fed to estimated error scaler 18. Estimated error scaler 18 receives information about how the originally input signal was transformed (scale and phase information) from the upsample detector 12. Estimated error scaler 18 further receives information from the display 28 or other device in the transmission chain that may provide a limitation on the signal that can be transmitted and displayed on display 28. (As an example, the input signal may be a 1080p signal, but the display is only capable of displaying a 480i signal). Estimated error scaler 18 applies scaling that results in the greatest image quality at display 28. Stated differently, it does not make sense for scaler 18 to restore the output signal to a 1080p signal if that signal is unusable by display 28 or if that signal is going to require another conversion later. Such later conversion is a potential source of further error. Estimated error scaler 18 outputs a scaled estimated error signal.

The input signal is also scaled if the output format does not match the input format. Again, the estimated error signal output from estimated error scaler 18 and the scaled input signal output from 22 are similarly formatted.

Each of the estimated scaled error (via post processor 20, block 370 of FIG. 3) and scaled input signal (via post processor 24) are then separately subjected to post processing to apply smoothing, edge enhancement, or the like, as appropriate.

Gain control 26 is then used to adjust the magnitude of the estimated error signal, block 380 of FIG. 3. The estimated error signal is then attenuated from the input signal, block 390, to produce an estimated error corrected signal to an output, block 395.

Accordingly, robust existing restoration algorithms for native formats can be applied regardless of what processing has been applied to a signal. The above described processing further consumes less resources than directly applying filtering and estimated error correction to up-sampled (or otherwise processed) signals.

Still further, the above device and method finds utility for standard definition video signals that include noise and have been upconverted to HD. Rather than trying to de-noise the HD signal directly (and this is a signal that is in an HD format, but did not originally have the resolution of HD) the present system determines the upsampling that occurred, returns the signal to its original standard definition, applies standard definition estimated error correction algorithms, then re-constitutes the upconverted signal as an HD signal with less noise/error.

The above devices and methods finds specific utility in, but are not limited to, graphics cards, computer systems, GPU's, video processing ASICs, set top boxes, digital TV's, printers, music devices, still image displays, and portable devices.

Error estimation and correction algorithms are often very processing intensive. By downscaling the input signal to a format closer to the native format, there is reduced signal data that is subjected to the error correction algorithm. In this way, computing time and power is conserved. Additionally, for ASIC implementations, processor area and power are conserved.

The present disclosure also includes a testing signal that is applied to the above circuit(s) to confirm their operation. Such testing signal, in the case of a video signal, is one that includes horizontal and vertical sweeps or other patterns (purposefully with and without noise) with various levels of upsampling and downsampling along the sweep. In such examples, the majority of the screen would be constructed from video sampled at a first rate to trigger the detectors and when video processing appropriate for the detected sampling rate was applied to the whole screen (including portions for which the applied processing was not appropriate), the other sections would stand out as being inappropriately processed.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

The software operations described herein can be implemented in hardware such as discrete logic fixed function circuits including, but not limited to, state machines, field programmable gate arrays, application specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as, but not limited to, CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the aforedescribed software, logic and structure may be created using such integrated circuit fabrication systems. In such a system, the computer readable medium stores instructions executable by one or more integrated circuit design systems that cause the one or more integrated circuit design systems to produce an integrated circuit.

What is claimed is:

1. A method of providing signal improvement including:
   receiving a first media signal in a first format, the first format resulting from having undergone at least one permutation from an original format, the first format being different than the original format;
   obtaining a second signal indicative of error within the first media signal, the second signal being in a second format, the second format being different than the first format;
   applying a second permutation to the second signal to place the second signal in the first format; and
   combining the first media signal in the first format and the second signal in the first format to produce an error-corrected first signal in the first format.

2. The method of claim 1, further including:
   determining a first permutation that, when applied, places the first media signal into the second format, the second format is a closer approximation of the original format than the first format; and
   applying the first permutation to the first media signal.

3. The method of claim 1, wherein obtaining a second signal
   indicative of error within the first media signal includes:
   applying a correction algorithm to the first signal in the second format to obtain a third signal in the second format.

4. The method of claim 3, wherein obtaining a second signal indicative of error within the first media signal further includes:
   determining a difference between the third signal in the second format and the first signal in the second format; and
   defining the difference as the second signal.

5. The method of claim 1, wherein the first format and second format differ with respect to at least one characteristic selected from the group of sampling rate and resolution.

6. The method of claim 1, wherein the second permutation is one operable to convert a signal in the second format to the first format.

7. The method of claim 1, further including applying post processing to the first signal and to the second signal prior to combining the first signal and the second signal.

8. The method of claim 1, further including adjusting gain associated with the second signal prior to combining the second signal with the first signal.

9. The method of claim 1, wherein the first signal is an upsampled video signal.

10. A signal processor including:
    a signal de-permutation element operable to at least partially reverse permutations previously applied to a first signal in a first, non-original format, the de-permutation element operable to take the first signal in the first format and place it in a second format that provides a closer approximation of an original format than the first format does;

an error estimation circuit operable to output a second signal indicative of error present within the first signal in the first format;

a first scaler operable to apply permutations to the second signal to place the second signal in the first format of the first signal; and a combiner operable to combine the first signal and the second signal in the first format to produce an error-corrected first signal in the first format.

11. The signal processor of claim 10, further including a signal processing element operable to apply one or more correction algorithms to the second signal.

12. The signal processor of claim 10, further including a signal permutation detector operable to detect permutations previously applied to the signal.

13. The signal processor of claim 10, further including a second scaler operable to transform the first signal into a third format and the first scaler is operable to place the second signal in the third format.

14. The signal processor of claim 10, wherein the signal de-permutation element is a downscaler.

15. The signal processor of claim 10, wherein the error estimation circuit is a noise removal circuit.

16. The signal processor of claim 10, wherein the format of the first signal has a first sampling rate and a format of the second signal has a second sampling rate lower than the sampling rate of the first signal.

17. A non-transitory computer readable medium containing instructions thereon, that when interpreted by at least one processor cause the at least one processor to:

receive a first media signal in a first format, the first format resulting from having undergone at least one permutation from an original format, the first format being different than the original format;

generate a second signal indicative of error within the first media signal, the second signal being in the second format, the second format being different than the first format;

apply a second permutation to the second signal to place the second signal in the first format; and combine the first media signal in the first format and the second signal in the first format to produce an error-corrected first signal in the first format.

18. The non-transitory computer readable medium of claim 17, wherein the instructions further cause the processor to:

determine a first permutation that, when applied, places the first media signal into a third format, the third format being a closer approximation of the original format than the first format; and apply the first permutation to the first media signal.

19. The non-transitory computer readable medium of claim 17, wherein the instructions further cause the processor to:

apply a correction algorithm to the first signal in the second format to obtain a third signal in the second format.

20. The non-transitory computer readable medium of claim 19, wherein the instructions are embodied in hardware description language suitable for one or more of describing, designing, organizing, fabricating, or verifying hardware.

21. The method of claim 1, wherein obtaining the second signal includes applying error removal processing to a signal derived from the first signal prior to combining the first signal and the second signal.

22. The method of claim 21, wherein the signal derived from the first signal has a format that is a closer approximation of the original format than the first format.

23. The method of claim 1, wherein the second signal is obtained without use of the first media signal in the original format.

* * * * *